Aug. 15, 1939  C. F. LAUTZ  2,169,496
LINK
Filed Aug. 27, 1937
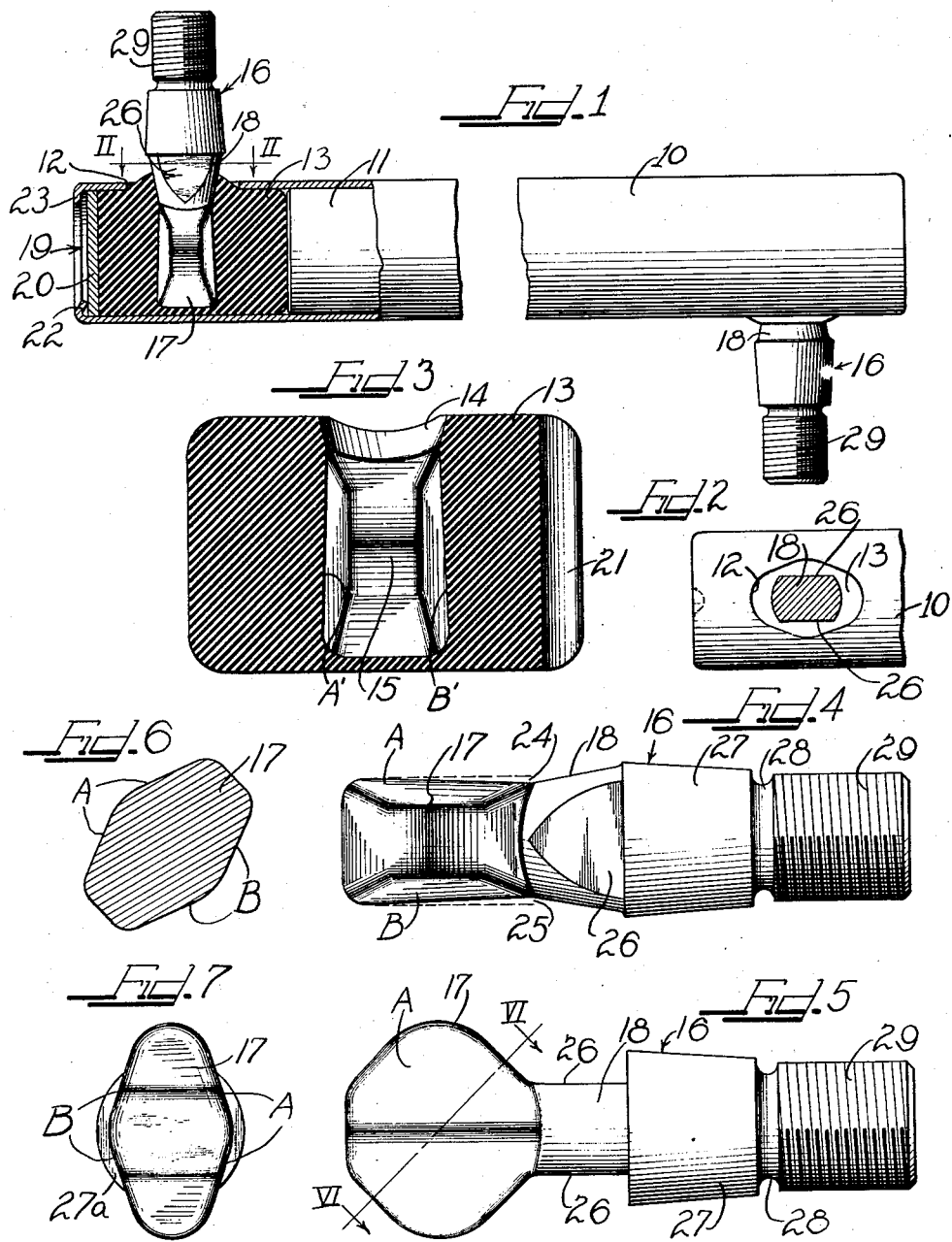
Inventor
CARL F. LAUTZ Patented Aug. 15, 1939

2,169,496

UNITED STATES PATENT OFFICE 2,169,496

LINK

Carl F. Lautz, Buffalo, N. Y., assignor to Houde Engineering Corporation, Buffalo, N. Y., a corporation of New York Application August 27, 1937, Serial No. 161,213

8 Claims. (Cl. 74—579)

This invention relates to link assemblies including a housing, a rubber bushing or a plurality of bushings in the housing and a connecting arm, or a plurality of such arms having an enlarged head provided with oppositely disposed broad faces sloping from the end of the head toward the shank of the arm to maintain the arm in proper seated position in the rubber bushing.

More specifically this invention relates to link assemblies including studs having enlarged heads whose widths are greater than their thicknesses and having oppositely disposed flat faces provided with a reentrant taper for maintaining the studs in proper seated relation in a rubber bushing of the link assembly.

In link assemblies according to this invention, a housing is provided for a rubber bushing. A stud extends from the housing and has a flattened head portion seated in the bushing. The housing is provided with an opening having a major axis longer than the major axis of the stud head and a minor axis shorter than the major axis of the stud head to permit insertion of the stud head in the bushing and to lock the stud head in the housing when it is rotated into seating position in the bushing. The rubber bushing may be provided with cavities providing for the seating of the stud head in the bushing.

It has been found that during use of link assemblies of this nature wherein relative movement between the housing and the connecting arms or stud is provided for by interparticle flow of the bushing material, that the stud may work toward the opening of the housing. According to this invention, the broad faces of the stud head are provided with a back taper tending to urge the stud deeper into the rubber bushing and thus counteracting the mechanical tendency in service of pulling the stud from the bushing.

The degree of the back taper or the amount of slope can be relatively small although the same may be varied throughout a wide range without departing from the scope of the invention. A variation in thickness of about .035 inch from the end of the stud head to the portion of the stud head adjoining the shank has been found to be satisfactory in commercial service.

It is then an object of this invention to provide a joint stud with an enlarged flattened head having oppositely disposed broad faces thereof sloping from the end of the head toward the shank of the stud.

Another object of this invention is to provide joint studs having enlarged flattened heads formed with a reentrant taper.

A further object of this invention is to counteract the tendency of joint studs from pulling away from rubber bushings in which they are mounted by forming a reentrant taper on the stud head.

Another object of this invention is to provide a link assembly including studs having oppositely disposed broad faces on the heads thereof provided with reentrant tapers and to seat said stud heads in rubber bushings.

Other and further objects of the invention will become apparent to those skilled in the art from the following detailed description of the annexed sheet of drawings which discloses a preferred embodiment of the invention.

On the drawing:

Figure 1 is a broken side elevational view, with a part thereof shown in vertical cross section of a link assembly according to this invention.

Figure 2 is a cross-sectional view with parts in elevation taken along the line II—II of Figure 1.

Figure 3 is an enlarged vertical cross-sectional view taken through a rubber bushing of a link assembly according to this invention.

Figure 4 is a side elevational view of a stud according to this invention used in the link assembly of this invention.

Figure 5 is a plan view of the stud shown in Figure 4.

Figure 6 is a cross-sectional view taken along the lines VI—VI of Figure 5.

Figure 7 is an end elevational view of the stud shown in Figure 5.

As shown on the drawing:

In Figure 1, the reference numeral 10 designates a metal tube forming the housing member of the link assembly. A solid rod 11 is disposed in the tube 10 intermediate the ends thereof.

Elongated openings, such as 12, are provided through the tube 10 near the ends thereof with the major axis of each opening extending longitudinally of the tube.

Rubber bushings 13 are mounted in each end of the tube 10 in abutting relation to the ends of the rod 11 in the tube.

The bushings 13, as shown in Figure 3, have circular openings 14 therein communicating with enlarged slots or recesses 15 formed in the central portion of the bushing. The recesses or slots 15 have the major axes thereof at right-angles to the major axes of the openings 12 in the tube.

Stud members 16 extend from the tube 10 through the openings 12 thereof and have enlarged flat heads such as 17 seated in the recesses 15 of the bushings. Shank portions 18 of the studs 16 snugly fit in the circular openings 14 of the bushings.

The stud heads 17 have a greater width than thickness. Their major axes are shorter than the major axes of the elongated openings 12 of the housing but longer than the minor axes of the opening 12. The studs 16 can therefore be inserted in the tube through the openings 12 thereof and rotated into seated positions in the bushing recesses 15. The stud heads 17 will then be locked in the tube 10 since the major axes thereof are larger than the minor axes of the tube openings 12.

The bushings 13 are held against the ends of the rod 11 by means of discs such as 19 (Figure 1) closing the ends of the tube 10. The discs 19 preferably have a bead portion 20 projecting therefrom for seating in a groove 21 (Figure 3) formed in the outer end of the bushing 13. A portion such as 22 of each end of the tube is pressed down into the groove provided by the bead 20 of the disc 19 to hold the disc against rotation relative to the tube. Since the bead 20 is seated in the groove 21 of the bushing, the bushing is likewise held against rotation in the tube and the opening 14 of the bushing will always be maintained in proper alignment with the opening 12 of the tube.

The remaining portion of the end of the tube 10 is spun or peened over the edge of the disc 19 as shown at 23. The bushings 13 are thus held between the rod 11 and closure discs 19 and are unexposed around their entire exterior surfaces except at the openings 12 in the tube.

As best shown in Figures 4 to 7, the stud head 17 has oppositely disposed broad faces A and B. The broad faces A and B converge toward the sides of the stud head from the center of the stud head as best shown in Figures 6 and 7.

The stud head itself is somewhat octagonal in shape but the side edges thereof are beveled so as to curve into each other.

As best shown in Figure 7, the converging broad faces A and B give the stud head a somewhat elliptical appearance in end elevation.

As pointed out hereinabove, it has been found that the flat stud heads tend to pull out of or work away from rubber bushings in which they are mounted. To counteract this tendency, according to this invention, the broad faces A and B of the stud heads are provided with a reentrant taper and slope from the end of the stud toward the shank of the stud as shown at 24 and 25 in Figure 4. This reentrant taper or back taper tends to constantly slide the stud head further into the bushing.

As shown in Figure 3, the sides A' and B' of the recess 15 in the bushing 13 may be provided with complementary tapers. These sides A' and B' of the recess 15 receive the broad faces of the stud head.

The bushings 13 are placed under longitudinal compression in the housing 10 between the ends of the rod 11 and the closure discs 19. The sides A' and B' of the recesses 15 in the bushings 13 are thus urged against the tapered faces A and B of the stud heads 17 and force the stud heads against the bottoms of the recesses. The complementary tapers of the sides A' and B' of the recesses 15 assist in holding the stud heads against working out of the recesses.

It is not essential, however, that the recesses in the rubber bushings be provided with reentrant tapers since the bushing material is deformable and when placed under longitudinal compression, the side walls of the recess will naturally flow against the broad faces of the stud head and since these faces are back tapered, the stud head will slide toward the bottom of the bushing.

As shown in Figure 3, the recess 15 of the bushing 13 has the same contour as the stud head 17 so as to snugly fit around the entire stud head.

While the bushing illustrated herein is a one-piece molded bushing provided with a molded recess for receiving the stud head, it should be understood that this bushing may be replaced with rubber blocks adapted to flow around the stud head and provide a seat therefor. The bushing can have many forms without departing from the principles of this invention.

As best shown in Figures 4 and 5, the shank portion 18 of the stud 16 is generally frusto-conical in shape with its base spaced from the stud head. In order to provide a wider angle of movement between the stud and the housing, the shank portion 18 of the stud can be ground flat on the opposite sides thereof that are disposed adjacent to the side walls of the elongated opening 12.

The stud 16 also has an eye receiving portion 27 disposed above the shank portion 18. The portion 27 is frusto-conical in shape with its base adjacent the base of the shank portion 18. As best shown in Figure 7, the base 27a of the eye receiving portion 27 is larger than the base of the shank portion 18 and provides a shoulder as shown.

The apex of the frusto-conical portion 27 is grooved as at 28 for receiving a washer, lock ring or other device. The top portion of the stud is cylindrical as at 29 and is threaded to receive a nut therearound.

From the above description, it should be understood that this invention relates broadly to studs for mounting in resilient bushings to provide link assemblies. The heads of the studs are flattened and have oppositely disposed broad faces provided with a reentrant taper or back taper so that the end of the stud head is thicker than any other portion thereof. The desired stud heads are generally polygonal in shape but have the sides thereof beveled so as to curve into each other. The broad faces of the stud head converge from their centers toward the sides thereof to define a somewhat elliptical shape in end elevation. These converging faces are thus curved in the direction of rotation of the stud about its own axis and assist such rotative movements of the stud.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A joint stud comprising a metal member having a cylindrical threaded end portion, a frustro-conical intermediate portion having the apex thereof adjacent the cylindrical end, a converging intermediate portion extending from the base of the frustro-conical portion, said converging portion having diametrically opposite flat sides parallel to the axis of said stud, and an enlarged flattened head extending from the apex of said converging portion, said enlarged head having a width greater than its thickness and having opposite broad faces thereof normal to said flat sides of said converging portion and sloping toward the shank.

2. A joint stud comprising a shank portion and en enlarged flattened head portion on the end of the shank, said head portion having oppositely disposed broad faces provided with a reentrant taper whereby the end of the stud head is thicker than any other portion.

3. A joint stud comprising a shank portion and a head portion, said head portion having a width greater than its thickness and being provided with two oppositely disposed broad faces curved in the direction of rotation of the stud about its own axis, said broad faces being provided with a back taper whereby the end of the head is thicker than the portion of the head adjoining the shank.

4. A joint stud comprising a shank portion and a flat polygonal head portion having appositely disposed broad faces converging laterally from the axial centers thereof and sloping toward the shank.

5. In a link assembly having a housing provided with an elongated opening giving entrance thereto, a rubber bushing in said housing defining a seat for a stud head and a stud member having a flat head seated against said bushing in substantially full contact therewith whereby movement of the stud member relative to the housing is provided for by interparticle flow of the rubber, the longer axis of said stud head being at an angle to the long axis of the housing opening and said longer axis of said stud head being less than the long axis of said housing opening but greater than the short axis of the opening whereby the stud head may be inserted through the opening and rotated at an angle to the long axis thereof to be seated and locked in the housing, the improvement which comprises broad faces on said stud head seated against said rubber bushing and sloping toward the opening in the housing whereby the end of the stud head is thicker than the portion of the stud adjacent the housing opening, and stud head is urged into the bushing.

6. A link assembly comprising a housing having an elongated opening giving entrance thereto, a resilient bushing in said opening having a recess therein in alignment with said housing opening, a stud having a shank portion extending from the housing through said opening and a head portion seated in said recess, said head portion having oppositely disposed broad faces abutting the bushing, said broad faces sloping toward the shank portion of the stud and means for maintaining the bushing under compression whereby the sloping broad faces of the stud head tend to urge the stud head further into the bushing.

7. A link assembly comprising a metal tube having elongated openings in the side walls thereof near the ends of the tube, the major axes of said openings being longitudinal of the tube, a rod in said tube intermediate the ends thereof, a pair of rubber bushings disposed in said tube abutting the ends of said rod, said rubber bushing having molded cavities therein in alignment with the tube openings, the major axes of said cavities being at an angle to the major axes of the tube openings, joint studs having shank portions extending through said openings from said tube and integral head portions seated in the cavities in said bushings, said head portions having oppositely disposed broad faces sloping toward the tube openings, said cavities in said rubber bushing having complementary broad faces sloping toward the tube openings for receiving the broad faces of the stud heads, and closure discs for the ends of said tube to maintain the rubber bushings under longitudinal compression whereby the sloping broad faces of the stud head and the complementary sloping faces of the cavities in the bushing urge the stud heads into the bushings.

8. In a link assembly having a housing provided with an opening giving entrance thereto and a rubber bushing within said housing, a joint stud comprising a shank portion and an enlarged flattened head portion on the end of the shank, said head portion having oppositely disposed broad faces provided with a reentrant taper whereby the end of the stud head is thicker than any other portion but always of such cross-section as will permit the insertion of said head through said opening.

CARL F. LAUTZ.